United States Patent [19]
Matsubara

[11] Patent Number: 5,254,921
[45] Date of Patent: Oct. 19, 1993

[54] ABNORMALITY DETECTING METHOD FOR A SERVO SYSTEM

[75] Inventor: Shunsuke Matsubara, Yamanshi, Japan

[73] Assignee: Fanuc Ltd., Japan

[21] Appl. No.: 571,524

[22] PCT Filed: Dec. 28, 1989

[86] PCT No.: PCT/JP89/01298
§ 371 Date: Aug. 28, 1990
§ 102(e) Date: Aug. 28, 1990

[87] PCT Pub. No.: WO90/08353
PCT Pub. Date: Jul. 26, 1990

[30] Foreign Application Priority Data

Jan. 10, 1989 [JP] Japan .................... 1-1373

[51] Int. Cl.$^5$ ............................... G05D 3/00
[52] U.S. Cl. .................... 318/561; 318/610; 318/611; 318/616
[58] Field of Search ............. 318/561, 565, 588, 603, 318/564, 565, 585, 632, 584, 611, 646, 615, 618, 616, 617; 364/474.35, 150, 153, 161, 184, 119, 118

[56] References Cited

U.S. PATENT DOCUMENTS

| | | | |
|---|---|---|---|
| 4,025,763 | 5/1977 | Kleiss | 318/636 |
| 4,052,642 | 10/1977 | Speth et al. | 318/561 |
| 4,055,135 | 10/1977 | Wesner | 318/565 X |
| 4,159,444 | 6/1979 | Bartlett et al. | 318/564 |
| 4,171,505 | 10/1979 | Shima et al. | 318/616 |
| 4,214,301 | 7/1980 | Kurihara et al. | 318/561 |
| 4,280,083 | 7/1981 | Hirai et al. | 318/565 |
| 4,338,659 | 7/1982 | Kurakake | 364/474.35 |
| 4,509,110 | 4/1985 | Levesque, Jr. et al. | 318/624 |
| 4,647,826 | 3/1987 | Ota | 318/561 |
| 4,914,726 | 4/1990 | Burke | 318/646 |
| 5,015,934 | 5/1991 | Holley et al. | 318/611 |

Primary Examiner—Paul Ip
Attorney, Agent, or Firm—Staas & Halsey

[57] ABSTRACT

An abnormality detecting method for a servo system capable of quickly detecting an abnormal condition even in a low rotation speed range is provided.

While a digital servo control section (11-13) is executes a servo control operation for controlling the drive of a servomotor in accordance with a torque command (Tc) derived from a speed feedback (VA) and a speed command (Vc) corresponding to an actual position deviation (Er), a simulator (14) integrates a speed command (Vcs) equal to the product of a position loop gain (PG) and an estimated position deviation (Ers) obtained by subtracting a position feedback (PAS) from a movement command (Mc). The simulator thus derives the position feedback (PAS), and an excessive error detecting section (15) compares the difference (Er−Ers) between the actual position deviation and the estimated position deviation with a predetermined value (As). When an abnormal condition occurs, the actual position deviation is increased while no substantial variation occurs in the estimated position deviation generated by the simulator for simulatively effecting a normal servo control operation. Hence the difference between the deviations reaches a predetermined value representing an occurrence of an abnormal condition, so that an alarm is generated.

2 Claims, 2 Drawing Sheets

ABNORMALITY DETECTING METHOD FOR A SERVO SYSTEM

TECHNICAL FIELD

The present invention relates to an abnormality detecting method for a servo system which is capable of quickly detecting an occurrence of an abnormal condition over a wide range of motor rotation speed.

BACKGROUND ART

In servo systems, generally, the difference (actual position deviation) between a command amount of movement and an actual amount of movement is periodically detected, and the drive of a servomotor is controlled in accordance with a torque command determined based on the difference (speed deviation) between a command speed, corresponding to the position deviation, and an actual speed. When the actual position deviation becomes larger than an allowable value, it is determined that the servomotor has been unable to follow the command for some reasons and hence an excessive error has occurred, and therefore, an alarm is generated to inform the occurrence of an abnormal condition.

Conventionally, the allowable position deviation for discriminating an excessive error is set to a large value, i.e., about 1.3 times the position deviation that can normally occur when the servomotor is rotated at a maximum speed. Therefore, when the motor is driven at a low speed, or when a currently stopped operating part (axis) of a direct drive robot is rotated at a low speed due to an interference torque generated by the movement of another operating part, a considerably long time elapses from the occurrence of an abnormal condition, e.g., a collision of a robot arm with an obstacle during a low-speed operation, until the position deviation reaches the allowable position deviation and thus the occurrence of abnormality is detected. As a result, a machine provided with the servomotor, such as a robot, may be damaged, or a workpiece may be excessively cut.

DISCLOSURE OF THE INVENTION

An object of the present invention is to provide an abnormality detecting method for a servo system which is capable of quickly detecting an occurrence of an abnormal condition over a wide range of motor rotation speed, particularly, in a low rotational speed range.

To achieve the above object, an abnormality detecting method of the present invention comprises the steps of: (a) simulatively effecting a response operation corresponding to a normal servo control during an execution of a servo control; and (b) determining an occurrence of an abnormal condition when a difference between an actual position deviation occurring in the servo control and a position deviation occurring in the simulated servo control becomes larger than a predetermined value.

As described above, according to the present invention, an occurrence of an abnormal condition in the servo system is determined when the difference between an actual position deviation occurring in the servo control and a position deviation occurring in the simulated servo control corresponding to a normal servo control becomes larger than the predetermined value. This makes it possible to quickly detect an occurrence of an abnormal condition over a wide range of motor rotation, particularly, in a low-speed rotation range. Accordingly, a damage to the machine, an excessive cutting of a workpiece, etc. can be positively prevented.

BEST MODE OF CARRYING OUT THE INVENTION

A digital servo control device for embodying an abnormality detecting method of an embodiment of the present invention comprises a microcomputer (not shown) which is arranged to achieve a function of a conventional digital servo circuit section 1 (FIGS. 1 and 2), and a function of an alarm generating section 2 (FIGS. 1 and 2) forming a principal part of the present invention.

Figure 1:
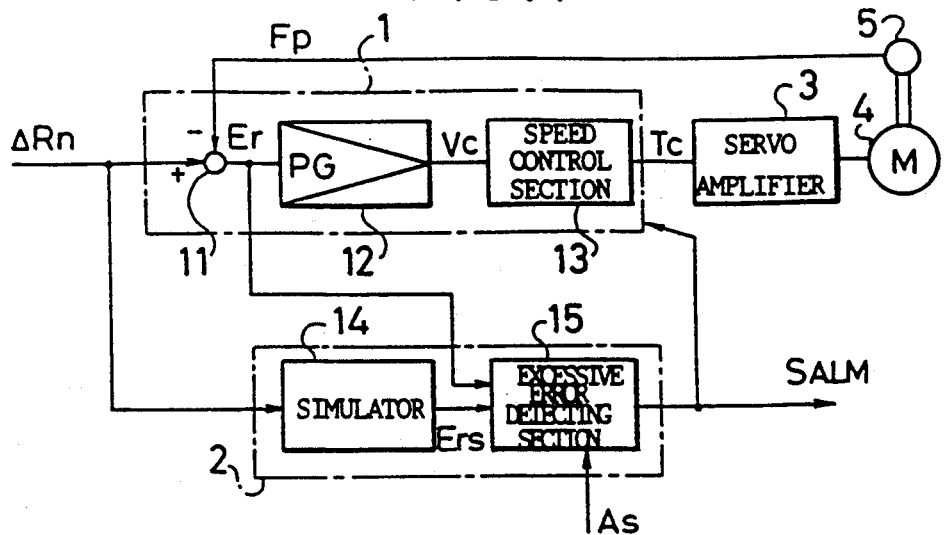
FIG. 1 is a functional block diagram showing a digital servo control device for carrying out an abnormality detecting method according to one embodiment of the present invention.

The digital servo circuit section 1, which operates to control the drive of a servomotor 4 via a servo amplifier 3 including, e.g., a transistor inverter and effecting pulse width modulation of voltages of individual phases of the servomotor 4, comprises an arithmetic operation section 11 for calculating a position deviation Er by subtracting a feedback pulse Fp in FIG. 1 (corresponding to position feedback PA in FIG. 2), supplied from a pulse coder 5 each time the servomotor 4 is rotated by a predetermined angle, from a command movement amount $\Delta Rn$ in FIG. 1 (corresponding to movement command Mc in FIG. 2) which is periodically supplied thereto. The servo circuit section 1 further comprises a gain setting section 12 for calculating the product (speed command Vc) of the position deviation Er and a position loop gain PG, and a speed control section 13 arranged to calculate the difference (speed deviation Ev) between the speed command Vc and the speed feedback VA (FIG. 2) in an operation section 13a thereof and arranged to calculate the product (torque command Tc) of the speed deviation Ev and a gain Kv in a gain setting section 13b.

Figure 2:
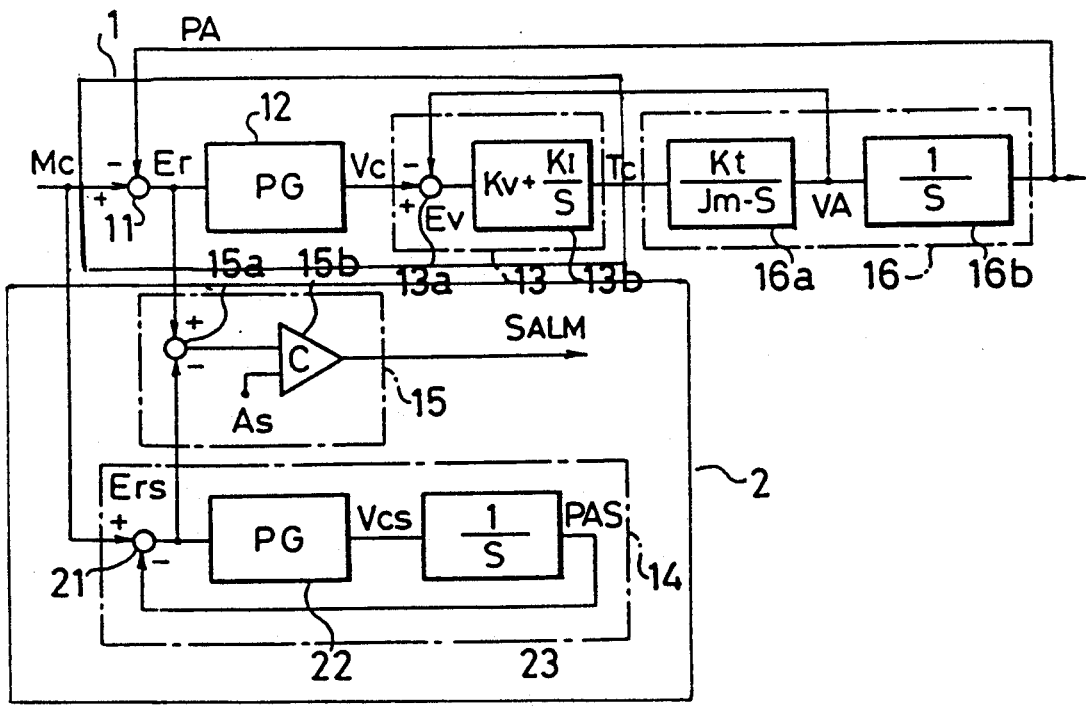
FIG. 2 is a block diagram illustrating the servo control device of FIG. 1 by using transfer functions.

A motor section 16 in FIG. 2, which corresponds to the servo amplifier 3, the servomotor 4 and the pulse coder 5 in FIG. 1, comprises a first transfer element 16a for receiving the torque command Tc to generate a speed feedback VA, and a second transfer element 16b for receiving the speed feedback VA to generate a position feedback PA. In the drawing, symbols Jm and Kt respectively denote motor inertia and torque constant.

The alarm generating section 2 comprises a simulator 14 for simulating a normal operation of the servo control system consisting of the elements 1 and 3 to 5, and an excessive error detecting section 15. The simulator 14 includes an arithmetic operation section 21 for calculating the difference (hereinafter referred to as estimated position deviation Ers) between the movement command Mc and a position feedback PAS, a first transfer element 22 for receiving the deviation Ers to generate an estimated speed command Vcs, and a second transfer element 23 for receiving the command Vcs to generate the estimated position feedback PAS. The transfer function PG of the element 22 is equal to the transfer function PG of the gain setting section 12 in the servo circuit section 1.

As is apparent from FIG. 2, the simulator 14 of the alarm generating section 2 is equivalent to such a servo system (composed of the elements 1 and 3 to 5) that the transfer function of the speed control loop consisting of the speed control section 13 and the first transfer element 16a of the motor section 16 is "1". In general, the transfer function of the speed control loop of the servo system can be approximated to "1", and therefore, the simulator 14, which is equivalent to a servo system wherein the transfer function of the speed control loop is "1", is approximate to a general servo control system. The simulator 14 for receiving the movement command Mc to generate the position feedback PAS has a first order transfer function whose time constant is equal to the reciprocal of the position loop gain PG, as shown in the following equation (1).

$$PAS/Mc = 1/\{((1/PG) \cdot S) + 1\} \quad (1)$$

The excessive error detecting section 15 of the alarm generating section 2 includes an arithmetic operation section 15a for calculating the difference between the actual position deviation Er derived by the servo circuit section 1 and the estimated position deviation Ers derived by the simulator 14, and a comparator 15b for generating an alarm SALM when the difference Er—Ers has become larger than a predetermined value As.

The operation of the digital servo control device shown in FIGS. 1 and 2 will be now described.

To achieve the functions of both the digital servo circuit section 1 and the alarm generating section 2, the microcomputer of the servo control device repeatedly and concurrently executes processes relating to the elements 1 and 2 at intervals of a predetermined period (hereinafter ΔT will be affixed thereto for the sake of explanation).

First, the function of the microcomputer relating to the element 1 will be described with reference to the functional block diagram of FIG. 1 and the block diagram of FIG. 2. When a movement command Mc is supplied, the digital servo circuit section 1 executes the position control loop process and the speed control loop process, shown in FIG. 2, at intervals of the predetermined period ΔT. Specifically, an actual position deviation Er is derived by subtracting the position feedback PA from the movement command Mc in the operation section 11 of the servo circuit section 1, and a speed command Vc is derived by multiplying the deviation Er by the position loop gain PG in the gain setting section 12. Further, in the speed control section 13a, torque command Tc is derived on the basis of the speed loop gains Kv, KI/S and a speed deviation Ev obtained by subtracting the speed feedback VA indicative of an actual motor speed from the speed command Vc. The servo amplifier section 3 controls the drive of the servomotor 4 in accordance with the torque command Tc.

During the aforementioned digital servo control operation, the microcomputer causes a random access memory (RAM) accommodated therein to store the actual position deviation Er, speed command Vc, actual speed deviation Ev and torque command Tc derived at intervals of the predetermined period ΔT.

Next, the excessive error detecting process (corresponding to the function of the alarm generating section 2) executed by the microcomputer will be explained with reference to FIG. 3.

Figure 3:
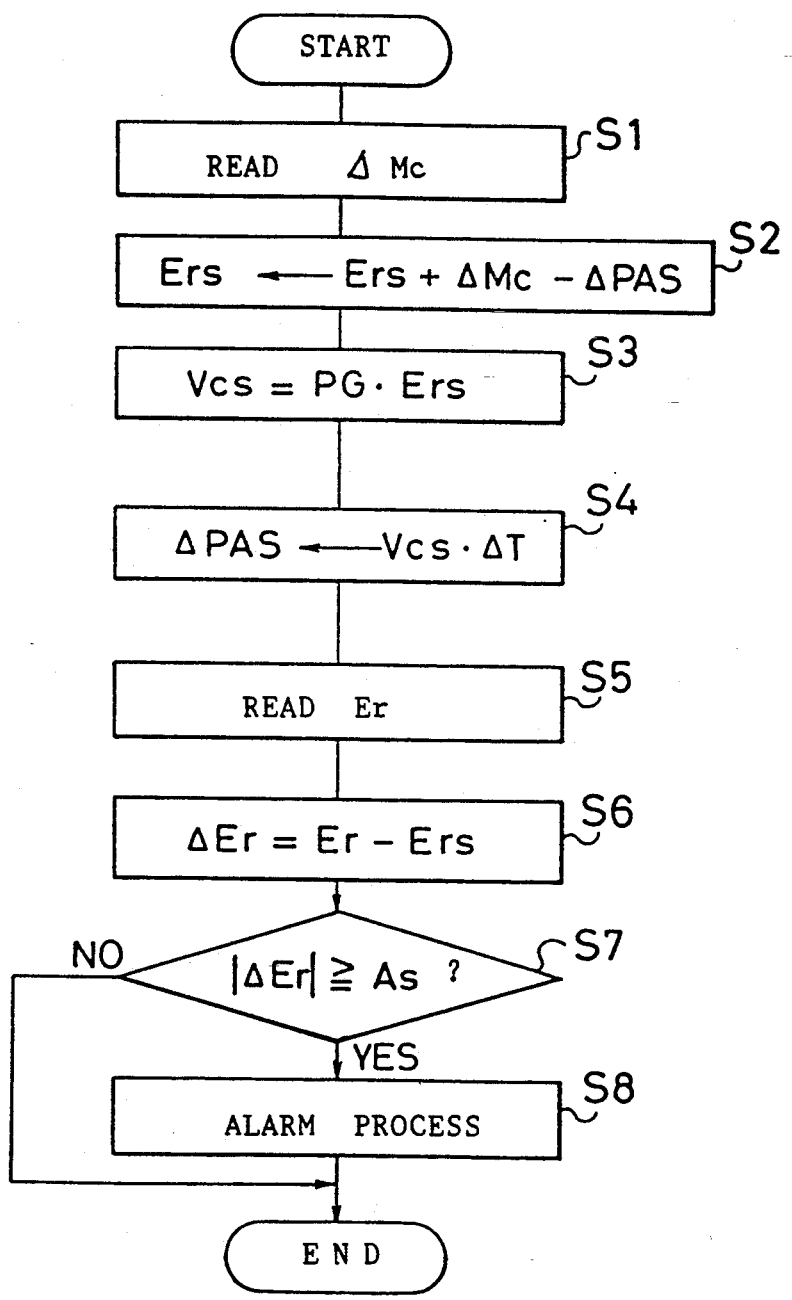
FIG. 3 is a flowchart of an excessive error detecting process executed by the servo control device of FIG. 1.

During the aforesaid servo control operation, the microcomputer repeatedly executes the process shown in FIG. 3 at intervals of the predetermined period ΔT in parallel with the servo control operation. First, the microcomputer reads out the movement command value ΔMc for the current detection process cycle (step S1). Then, the movement command value ΔMc is added to the estimated position deviation Ers of the previous cycle read from a register in the computer, and an estimated movement amount ΔPAS within a time ΔT from the previous cycle to the current cycle, read from another register, is subtracted from the result of the addition. Further, the value thus obtained is stored in the register as an estimated position deviation Ers for the current cycle (step S2). Then, an estimated speed command Vcs is derived by multiplying the estimated position deviation Ers by the loop gain PG (step S3), and the resultant value is multiplied by the time ΔT to obtain an estimated movement amount ΔPAS within a time from the current cycle to the next cycle, and the estimated movement amount is stored in the register (step S4). Repeatedly speaking with reference to the functional block diagram of FIG. 2, a speed command Vcs equal to the product of the position loop gain PG and the estimated position deviation Ers, obtained by subtracting the position feedback PAS from the movement command Mc in the operation section 21 of the simulator 14, is computed in the first transfer element 22, and then, the command Vcs is integrated in the second transfer element 23 to obtain a position feedback PAS. After all, as described before, the simulator 14 simulatively effects a normal servo control operation corresponding to a normal motor operation wherein the rotation of the servomotor 4 correctly follows the movement command Mc.

Referring again to FIG. 3, the computer reads from the RAM the actual position deviation Er occurring during the servo control operation (step S5), computes the difference ΔEr between the actual position deviation Er and the estimated position deviation Ers by subtracting the latter from the former (step S6), and determines whether or not the absolute value |ΔEr| of the thus computed difference is equal to or larger than the predetermined value As (step S7). To explain this operation again with reference to FIG. 2, the excessive error detecting section 15 compares, in the comparator 15b, the predetermined value As with the difference between the actual position deviation Er and the estimated position deviation Ers computed in the operation section 15a.

During a normal motor operation, the estimated position deviation Ers is approximate to the actual position deviation Er, and therefore, the computer determines in step S7 that the absolute value |ΔEr| is smaller than the predetermined value As, in which case, the excessive error detecting process of FIG. 3 for the current cycle is completed.

Thereafter, if an abnormal condition occurs in the motor operation for any reason, for example, a robot arm collides with an obstacle, or a currently stopped machine operating part (axis) is moved due to an interference torque generated by the movement of another machine operating part, the servomotor 4 fails to properly follow the movement command Mc, and thus the actual position deviation Er is increased. In this case, no substantial variation occurs in the estimated position deviation Er generated by the simulator 14 for simulatively effecting a normal servo control operation, that is, no substantial variation occurs in the estimated position deviation Ers computed in step S2. As a result, the absolute value $|\Delta Er|$ of the difference between the actual position deviation Er and the estimated position deviation Ers reaches the predetermined value As which indicates an occurrence of an abnormal condition. When it is determined in step S7 that the absolute value $|\Delta Er|$ is equal to or larger than the predetermined value As, the computer determines that an abnormal condition has occurred, and executes the alarm process (step S8). Namely, the computer generates an alarm SALM, interrupts the pulse width modulation process of the servo amplifier section 3, turns off the servomotor power source, and displays an alarm.

I claim:

1. An abnormality detecting method for a servo system, comprising the steps of:

(a) simulatively executing a response operation corresponding to a normal servo control operation during an execution of a servo control operation by a simulator having a time constant equal to the reciprocal of a position loop gain of the servo system and represented by a first-order transfer function given by: $1/[(1/PG)S+1]$, where PG is a position loop gain and S is a laplacian operator; and (b) determining an occurrence of an abnormal condition when a difference between an actual position deviation occurring in the servo control operation and a position deviation occurring in the response operation simulatively executed in step (a) becomes larger than a predetermined value.

2. An abnormality detecting method according to claim 1, wherein the normal servo control operation is simulatively effected in the response operation simulatively executed in step (a).

* * * * *